(12) United States Patent
Fish et al.

(10) Patent No.: US 7,305,656 B2
(45) Date of Patent: Dec. 4, 2007

(54) CONTENT MANAGEMENT FRAMEWORK FOR USE WITH A SYSTEM FOR APPLICATION DEVELOPMENT

(75) Inventors: John D. Fish, River Forest, IL (US);
Benjamin R. Wolf, Chicago, IL (US);
Amy M. Gilchrist, Chicago, IL (US);
Michael D. Wolf, Chicago, IL (US);
Daniel A. Hartley, Chicago, IL (US);
Matthew C. Dorn, Holland, MI (US)

(73) Assignee: Hubbard & Wells, Chicago, IL (US)

( * ) Notice: Subject to any disclaimer, the term of this patent is extended or adjusted under 35 U.S.C. 154(b) by 618 days.

(21) Appl. No.: 10/367,261

(22) Filed: Feb. 14, 2003

(65) Prior Publication Data
US 2003/0222906 A1    Dec. 4, 2003

Related U.S. Application Data

(60) Provisional application No. 60/357,293, filed on Feb. 14, 2002.

(51) Int. Cl.
*G06F 9/44* (2006.01)
(52) U.S. Cl. .................. 717/105; 717/109; 717/121
(58) Field of Classification Search ............ 717/105, 717/109, 121
See application file for complete search history.

(56) References Cited

U.S. PATENT DOCUMENTS

| | | | | |
|---|---|---|---|---|
| 6,490,590 | B1 * | 12/2002 | Fink | 707/100 |
| 6,662,357 | B1 * | 12/2003 | Bowman-Amuah | 717/120 |
| 2001/0037380 | A1 * | 11/2001 | Wall et al. | 709/219 |
| 2002/0059183 | A1 * | 5/2002 | Chen | 707/1 |
| 2003/0007000 | A1 * | 1/2003 | Carlson et al. | 345/713 |

* cited by examiner

Primary Examiner—Tuan Dam
Assistant Examiner—John Romano
(74) Attorney, Agent, or Firm—Blakely, Sokoloff, Taylor & Zafman

(57) ABSTRACT

A dynamic data-modeling system and a content management framework combined into a high-level application development framework is disclosed. In one embodiment, the system for application development, comprises a data-modeling framework configured to enable a user to define a logical data model. The data-modeling framework dynamically translates the logical data model into a corresponding physical data model. The changes to the logical data model are automatically adjusted in the physical data model accordingly. A content management framework is coupled to the data-modeling framework. The content management framework is configured to provide tools to enable the user to manage content associated with the physical data model based on the logical data model.

20 Claims, 15 Drawing Sheets

CONTENT MANAGEMENT FRAMEWORK FOR USE WITH A SYSTEM FOR APPLICATION DEVELOPMENT

RELATED APPLICATION

This application claims priority to a U.S. Provisional Patent Application having Ser. No. 60/357,293, filed on Feb. 14, 2002 and incorporated herein by reference.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto: Copyright© 2002, Hubbard One, Inc., All Rights Reserved.

FIELD OF THE INVENTION

The present invention relates to a computer system configured to provide a dynamic data-modeling system and a content management framework combined into a high-level application development framework.

BACKGROUND

Since the mid-1990s, web applications have become among the principal means of communication between a business and its customers, employees and partners. More generally, distributed applications of all kinds, including web applications, are used by businesses to communicate, transact and manage information.

Distributed applications have three main layers: the data layer, the application layer, and the presentation layer. The data layer contains two main types of data: the business content, and the supporting data required by the applications.

The current application development process is as follows. Applications must first be carefully planned and designed. Then, a database model for the application must be designed. After the database is fully designed, the physical database is constructed. Then, the application is programmed to access information from the database, process and manage the data, and present the results to the user. The application may also request input from the user, process and manage the data, and insert data into the database.

Despite the importance and popularity of distributed applications, application development has remained a largely non-automated, technical, risk-prone, and costly business process. It is particularly difficult to design and maintain large-scale applications, especially as the data model changes over time.

A data model is the product of the database design process that aims to identify and organize the required data logically and physically. A physical data model describes what information is to be contained in a database and how the items in the database will be related to each other. A properly designed physical data model will structure the data in a way that accurately reflects actual meaning of the data and its relationships. It requires great skill, technical and business insight, and disciplined use of good form to build a good physical data model for a software application.

There are various data-modeling tools available to assist developers with the data-modeling process, however, these tools are not typically utilized once the data model design is complete. That is, software applications written by to access the database are executed independently of the data-modeling tools because the applications are interacting directly with the physical database.

Physical data models are therefore difficult to change once the database is configured, and especially once the application data has been inserted into the database. Consequently, in complex systems, compromises are often made to allow the data model to remain unchanged or to change in a way that is easier but not optimal. For example, it is often more convenient to leave data labels unchanged even when the contents to be described by those labels have changed. This leads to confusion or errors for users not familiar with the original data model design.

Because of the difficulty in creating a well-designed physical data model, and because of the sub-optimal nature of the way data models are changed over time, physical data models often do not properly or intuitively reflect the intended meaning of the data they contain.

Furthermore, physical data models are limited in the concepts that they inherently support. For example, relationships between two pieces of data are represented by a physical join type (e.g., one-to-many) but not by a meaningful relationship label (e.g., "Authors" where a relationship between people and publications is established.). Also, it can be cumbersome and non-intuitive to navigate a physical data model in order to write the code required to insert and retrieve data from the database.

Importantly, software applications are designed to interoperate with a physical database (e.g., SQL Server, Oracle). If the database changes, the applications must be manually updated to accommodate the change. Applications, like the databases they rely on, are hard to maintain over time. For example, applications that utilize relational databases often use the SQL query language to exchange information with the data layer. As the database is modified, the SQL must also be modified to accommodate the changes. After changes are made, the application must also be carefully re-tested, which is a time-consuming process.

Similarly, if the applications change, the underlying database often requires adjustment. This is true because neither the database nor the application has any "awareness" of the other; the layers operate independently.

Another area of inefficiency in the application development process is the re-development of common components that occurs because of the difficulty of code re-use. Many business applications share common concepts such as workflow, security, and content management screens. But because applications rely on the physical database, and the physical databases vary in structure, application concepts must be largely or completely rewritten for each application. For example, security is a general concept that may refer to having the application provide access on the basis of user groups or conditions. Exactly how security will be implemented from application to application can vary dramatically. The database (e.g., SQL Sever, Oracle) may provide a security framework, but the developer must extend that framework into the application layer, and ultimately to the presentation layer. Therefore, much time and effort is spent redeveloping and implementing features that are common to many applications. Even within a single organization or small development team, it is difficult to reuse application code because the specific configuration of the physical data model requires that the application code be adjusted as the code is implemented.

A web application, or most any distributed application development process, depends on a well-designed and maintained data model. But because both applications and physical data models are hard to maintain, data models are often sub-optimal and applications are often left unchanged when the change is needed. Also, because the application development process interacts with the physical database, the process is complicated, prone to error and inefficient.

SUMMARY OF THE INVENTION

A dynamic data-modeling system and a content management framework combined into a high-level application development framework is disclosed. The system for application development, comprises a data-modeling framework configured to enable a user to define a logical data model. The data-modeling framework dynamically translates the logical data model into a corresponding physical data model. The changes to the logical data model are automatically adjusted in the physical data model accordingly. A content management framework is coupled to the data-modeling framework. The content management framework is configured to provide tools to enable the user to manage content associated with the physical data model based on the logical data model.

DESCRIPTION OF THE DRAWINGS

The accompanying drawings disclose various embodiments of the present invention for purposes of illustration only and are not intended to limit the scope of the invention.

DETAILED DESCRIPTION

Figure 1A:
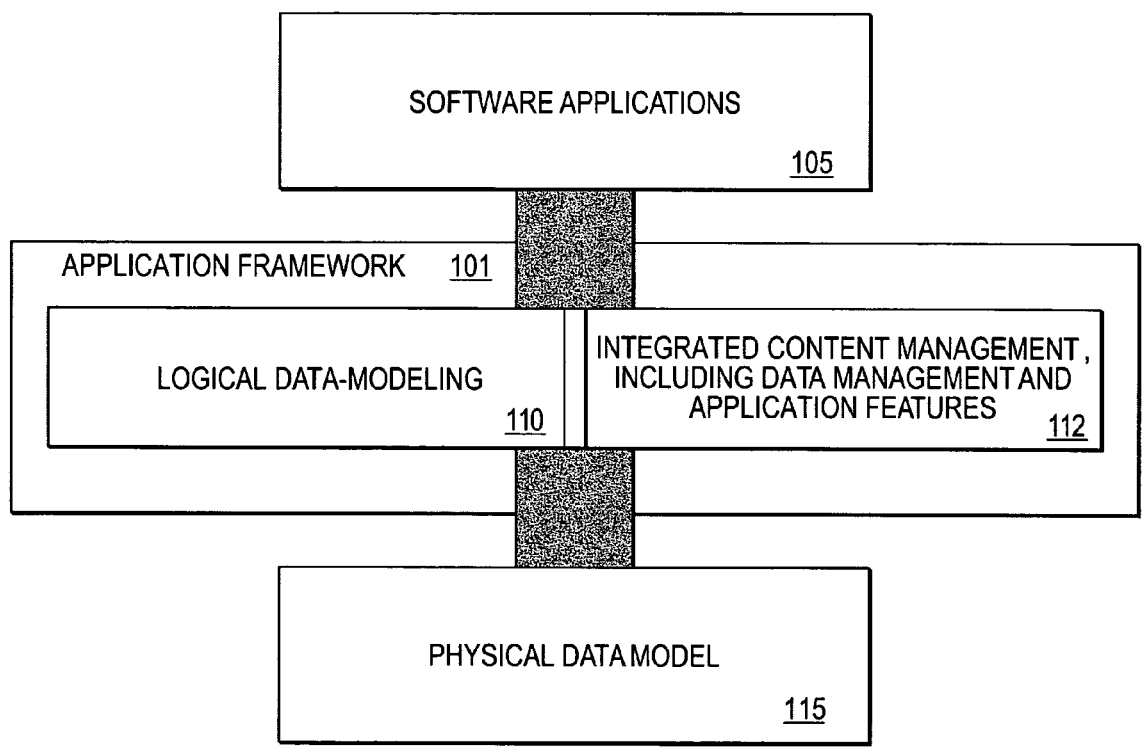
FIG. 1A is a block diagram illustrating an example of a system employing the data-modeling framework and the application framework in accordance with one embodiment of the invention.

Described herein is a dynamic data-modeling system and a content management framework combined into a high-level application development framework. In one embodiment, the system for application development, comprises a data-modeling framework configured to enable a user to define a logical data model. The data-modeling framework dynamically translates the logical data model into a corresponding physical data model. The changes to the logical data model are automatically adjusted in the physical data model accordingly. A content management framework is coupled to the data-modeling framework. The content management framework is configured to provide tools to enable the user to manage content associated with the physical data model based on the logical data model.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Some portions of the detailed description that follow are presented in terms of algorithms and symbolic representations of operations on data within a computer memory. These algorithmic descriptions and representations (e.g., in the form of flow charts) are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

I. Introduction

Before discussing the various details that make up an exemplary embodiment of the present invention, it is helpful to provide an overview of the system that makes up the present application framework for web-based and other software applications. As will become evident upon review of this specification, the present invention provides both a data-modeling environment that helps software developers structure and manage information for use in business applications, and an application framework that provides tools developers need to build applications on that information.

The present invention thus acts as the "engine" that powers web sites, intranets or in fact any distributed application.

To accomplish these objectives, the present invention combines a dynamic data-modeling system and a content management system into a high-level application framework. The data-modeling features provide the tools needed to structure and manage data for use in business applications. Developers can interact with intuitive GUIs for the logical representation of the data model, called the information model. As the information model changes, the present system adjusts the corresponding physical data model accordingly. This separation of the data model into logical and physical layers combines the advantages of traditional relational database design, including performance, flexibility, and data normalization, with the speed, manageability, and ease-of-use of higher level content management systems. It also frees developers from any particular physical data store and allows them to build real, data-driven applications (that can be migrated from one data store to another) from a true relational data model.

The application framework aspect of the present invention provides high-value tools to help developers access, process and present data and manage the user experience. Because the application framework is integrated with the information model, the application tools adjust as the data model adjusts, dramatically reducing the maintenance effort as compared with traditional development approaches.

The combination of a dynamic data-modeling system and content management system into a high-level application framework provided by the present invention allows an organization to tie multiple and disparate applications together, and then extend the data and application functionality where the others leave off. The present invention can thus be used to build complete and, stand-alone applications, or it can be used in conjunction with existing systems. In either scenario, the features provided by the present invention free developers from having to spend their time on low-value, maintenance-oriented tasks such as content administration, data integration and history tracking, because the present system handles these (and other) tasks automatically. This allows developers to concentrate on other aspects of application development.

From the above it should be apparent that the present invention is very different from prior application frameworks in several ways. First, the present invention integrates dynamic data modeling with a content management framework. Both the data modeling and content management tools are dynamic, in that changes in one are automatically reflected in the other, even in production. Second, the present invention operates at a higher level, providing most features in an intuitive graphical interface, but always giving the developer API access. Third, the focus of the present invention is on rapid development and simplified management of information-rich business applications.

Although the present system and prior content management systems share many features like: document management, workflow, history logging, security framework, and automatic forms creation; those prior content management systems work primarily with unstructured content, layering on metadata, and only allowing users to interact in a publishing model. The present system, on the other hand, follows a data driven approach; storing data in a true relational database format. Any "meta data" in the present system is itself part of the structured content that will make up the application. Thus, the present system is an ideal tool to manage content rich applications like Web sites and intranet applications. With this overview in mind then, we now turn to the details of an exemplary embodiment of the present invention.

II. A Logical Data-Modeling & Integrated Application Framework

FIG. 1A is a block diagram illustrating an example of a system employing the data-modeling framework and the data-management framework in accordance with one embodiment of the invention. As part of the system, the application framework 101 includes a data-modeling framework 110 for logical data-modeling and an integrated content management framework 112 to allow developers to manage the physical database while taking advantages of features provided by the data-modeling framework 110. The data-modeling framework 110 and the integrated content management 112 together provide the developers an integrated framework for database application development. For example, a software developer uses the data-modeling framework 110 to develop a logical data model, which is dynamically translated by the data-modeling framework 110 into a physical data model 115. The integrated content management 112 provides features, in conjunction with the data-modeling framework 110, to provide enhanced representation of information in the physical data model 115. These features are available to the software developer and include, for example, content management features, navigation features, etc. The software developer and software applications 105 can take advantage of these additional features by interacting with the integrated content management 112. The integrated content management 112 in turn interacts with the physical data model 115.

The integrated application framework 101 of the data-modeling framework 110 and the integrated content management 112 may be accessible from a workstation using a local or a remote network connection and a web browser (e.g., Internet Explorer). The physical data model 115 may be implemented using a variety of data stores, including relational and non-relational data stores. For the purposes of this illustration, the term database and data store are used interchangeably. The figures though describe a relational database implementation that could include, for example, Microsoft SQL Server 2000. The system may employ development tools such as, for example, Component Object Model (COM), Distributed COM (DCOM), Component Object Model Plus (COM+), Open DataBase Connect (ODBC), Simple Object Access Protocol (SOAP), Lightweight Directory Access Protocol (LDAP), Active Directory, Novell Directory Service (NDS), eXtensible Markup Language (XML), etc., to perform various development tasks including the dynamic translation of the logical data model into the physical data model 115. Interactions by the software developer with the system may be performed through one or more graphical user interfaces using, for example, Windows 2000, Internet Explorer, etc.

There may be verifications performed to confirm that the user is authorized to access the system. This may include, for example, requiring the user to provide user identification and a password.

III. The Logical Data Model

Figure 1B:
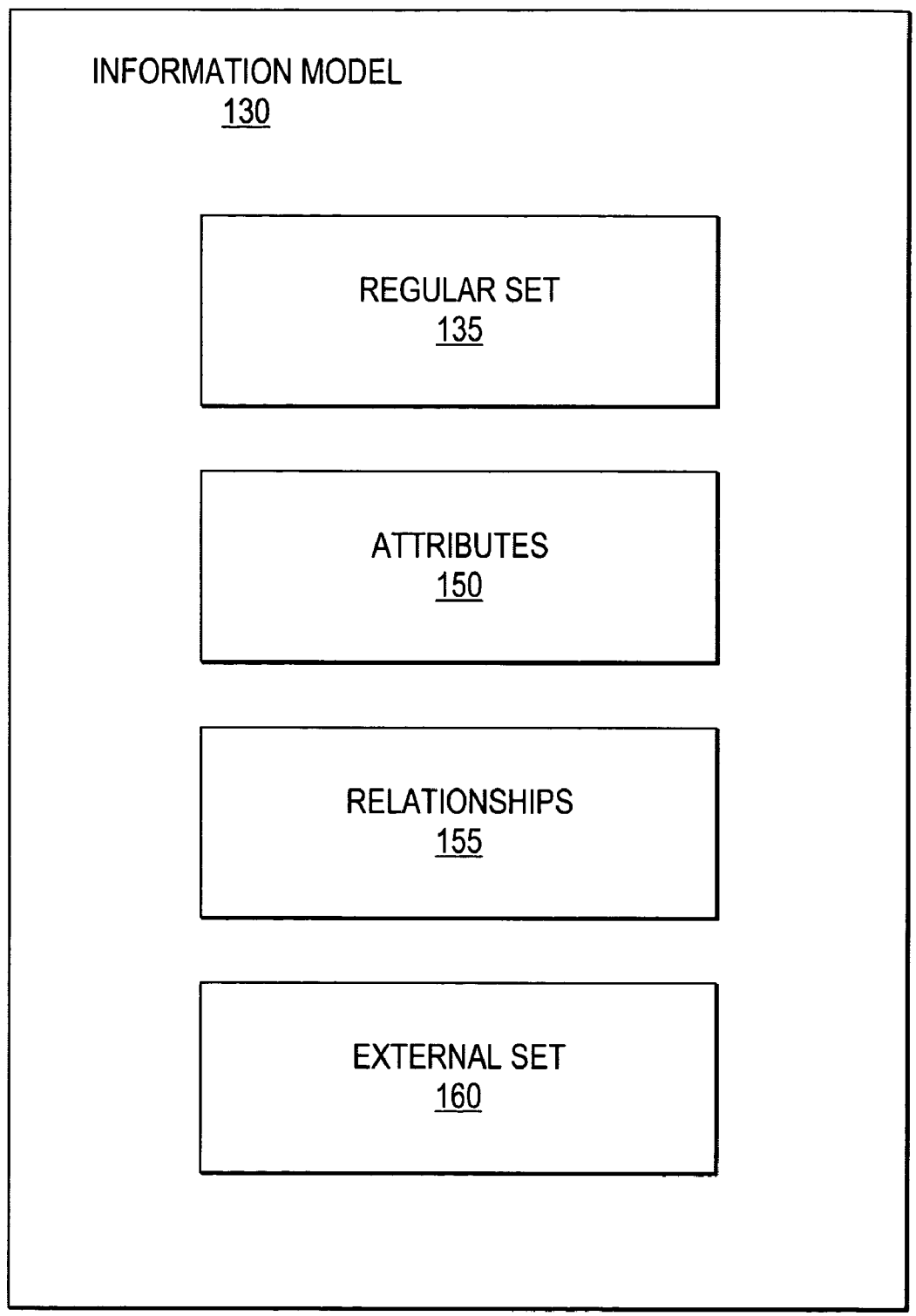
FIG. 1B is a block diagram illustrating some of the components in the logical data model.

FIG. 1B is a block diagram illustrating some of the components in the logical data model. The logical data model is also referred to as an information model. The software developer is also referred to as a user. Using the data-modeling framework 110, a user defines the information model 130 by describing logical groups of information and relationships of the groups to one another. A logical group of information is referred to as a set (or regular set) 135. Each set is represented in the physical database (or data store) associated with the physical model 115 and may include other enhanced features provided by the data-modeling framework 110. The physical representation (e.g., table in a relational database) is transparent to the user because the user only needs to be aware of the information available in the information model 130. Changes to the tables are made using the data-modeling framework 110. The information model 130 may include one or more external sets 160. The external sets 160 allow the user to incorporate external data sources into the information model 130.

Each set is comprised of one or more attributes. For example, the set 135 includes the attributes 150. The attributes 150 include data types that determine formats and characters that can be stored in the physical database associated with the physical data model 115. The system supports the standard data types supported by the physical database, enhanced data types that are not natively supported by the physical database but are made available by the system, and custom data types defined by the user.

A set may be related to other sets forming relationships. For example, relationships 155 may be defined for the set 135 to include one or more other sets that the set 135 is related to. A descriptive label or name is used to represent a set, an attribute, or a relationship. The descriptive label allows a user to provide a friendly, easy-to-recognize, and meaningful label that can be changed without affecting the physical data model. The data-modeling framework 110 manages the sets, the attributes, and the relationships in the information model, and the integrated content management 112 provides for access controls, workflow, security, history, content management, navigation, etc.

IV. Defining an Information Model

Figure 1C:
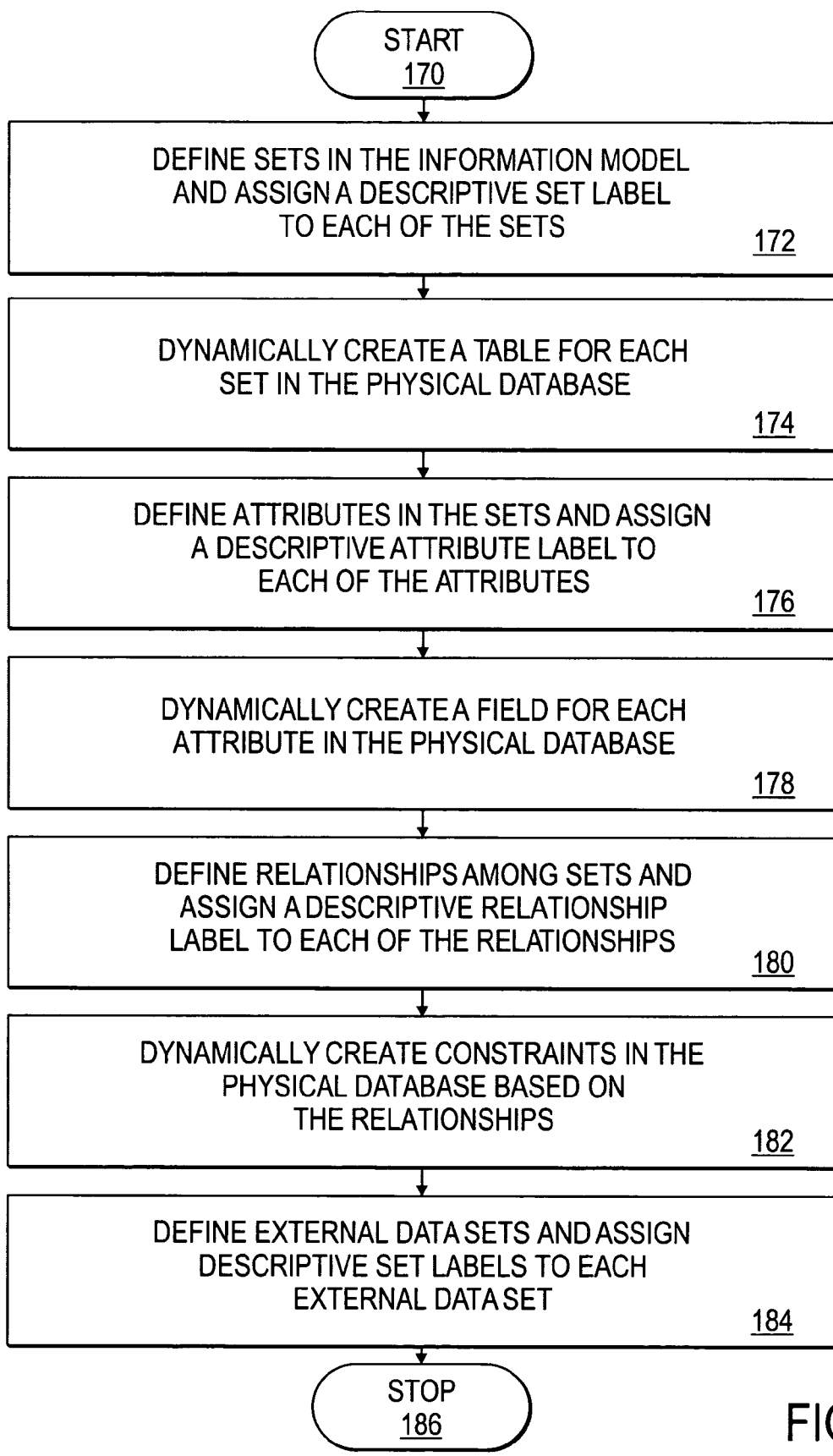
FIG. 1C is a flow diagram illustrating an information model definition process using the data-modeling framework in accordance with one embodiment of the invention.

FIG. 1C is a flow diagram illustrating an information model definition process using the data-modeling framework 110 in accordance with one embodiment of the invention. The process is initiated by a user and starts at block 170. At block 172, the user defines the sets that make up the information model. There may be multiple sets in the information model. A set is representative of a table in the underlying physical data model, but is enhanced with meta data that is stored in the system tables. Each set is assigned a descriptive set label. As the sets are defined, corresponding meta data is stored in the system tables, and the corresponding tables are automatically generated by the data-modeling framework in the physical data model, as shown in block 174.

At block 176, when the sets have been created, the user populates the sets with attributes. The attributes are logical extensions of the fields of the tables in the physical data model. A set may contain one or more attributes, which are units of information regarding the actual data. Each attribute is assigned a data type, a descriptive attribute label, and a size when appropriate. By assigning a data type and size to the attribute, necessary constraints can be built in the physical data model by the data-modeling framework to validate the data associated with that attribute. As the attributes are defined, corresponding meta data is stored in the system tables and the resulting fields in the tables are automatically generated by the data-modeling framework in the physical data model, as shown in block 178.

At block 180, when one or more sets have been created, the user can define relationships between the sets, or between a set and itself. A relationship is made between a set and a related set. A relationship is bi-directional (i.e., from the set to the related set, and from the related set to the set).

Each relationship is assigned two descriptive relationship labels, one for each direction of the relationship. A relationship is an extension of a join between two tables in the physical data model, including the physical join and meta data such as the directional, in-context labels. For example, a relationship between a set "Articles" and a related set "Person" might be labeled "Author" from the direction of set "Articles." That same relationship has a different meaning in the other direction. For example, the relationship can be labeled "Articles Authored" from the direction of set "Person." As the relationships are defined, resulting constraints in the tables are automatically generated in the physical data model and corresponding meta data is stored in the system tables by the data-modeling framework, as shown in block 182.

At block 184, the external data sets are defined. The external sets behave like sets, except that their definition and data is imported from external data sources. Each external set is assigned a descriptive set label. By defining and making the external sets available, the user can incorporate the external data sources into the information model. The process in FIG. 1C stops at block 186. At this point, the information model has been defined and translated by the data-modeling framework into the physical data model, including generation of a physical database and storage of corresponding meta data in the system tables. The physical database includes tables and fields corresponding to the sets and attributes defined in the information model. The physical database also includes constraints imposed on the tables and the fields based on the relationships among the sets, the data types of the attributes, etc.

Thus, the information model is tightly coupled with the data-modeling framework and the resulting physical database. Once the information model is defined, the user can create custom applications such as, for example, content management applications, to manage data in the database using the information model and the functionalities of the data-modeling framework.

Following is a list of examples of standard data types that may be used to define attributes:

Alphanumeric

Unicode Alphanumeric

Bit

Date/Time

Integer

Floating point

Long Text

Following is a list of examples of enhanced data types that may be defined with the attributes:

File (Image): This data type stores and manages image files. It supports one or more different image file extensions including but not limited to, for example, .pdf, .vsd, .ppt, .jpg and .mpp. While some databases can store images in the database, it is often preferable to store the file on the server file system and refer to the file from the database. When the file type image is selected, the system automatically manages this file management activity for the user.

File (Non-Image): This data type stores and manages non-image, e.g., document files. It supports one or more different file extensions including but not limited to, for example, .doc, .xls, .ppt, .vsd, zip, and .pdf. While some databases can store documents in the database, it is often preferable to store the file on the server file system and refer to the file from the database. When the file type document is selected, the system automatically manages this file management activity for the user.

The user may create custom data types to be assigned to the attributes. The ability to define custom data types allows for the creation of type codes and allows the user flexibility of data choices for the attributes. There may be multiple custom data types, and each custom data type is assigned a data type name, and a description. Once a custom data type is defined, the user is able to specify members of the custom data type. A description may be specified for each member. Members are alphanumeric values that are unique to other members within each grouping. These alphanumeric values represent acceptable data values for the custom data type. For example, a custom data type "States" may have the members "Illinois", "California", and "New York". When adding an attribute to a set, the user may choose any of the available attribute types, including the custom data types, from a list of attribute types. When editing records in a set that includes attributes of the custom data type, only members of the custom data type will be valid entries for that attribute. In one embodiment, this set stores an ID/reference to the type codes so that if the name of the member is modified, the reference remains intact.

V. Content Management—Data Access, Data Manipulation and the Presentation Layer

Figure 2:
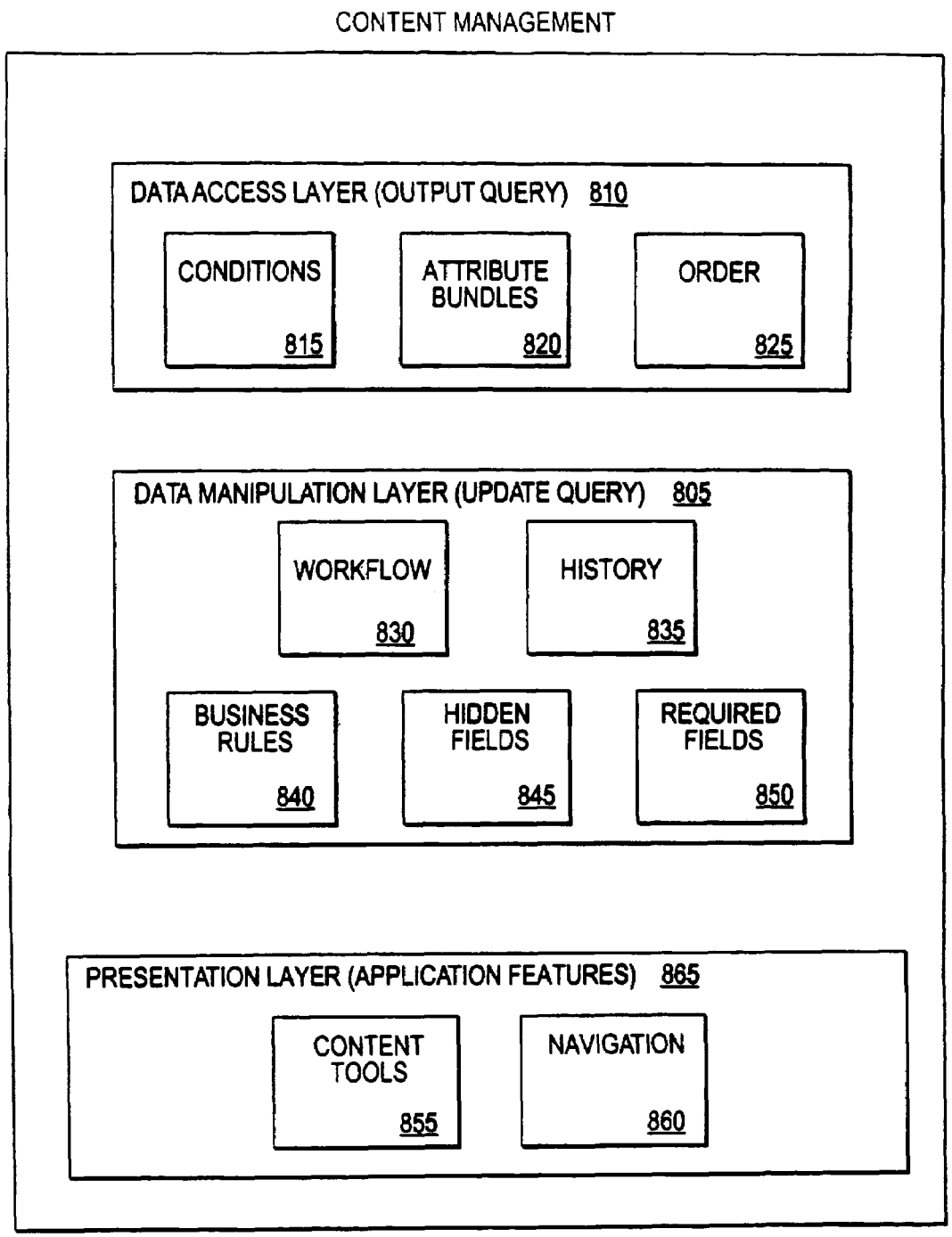
FIG. 2 is a block diagram illustrating examples of features available in the integrated management.

FIG. 2 is a block diagram illustrating examples of features available in the integrated content management 112. As described above with reference to FIG. 1, the integrated content management 112, including content management aspect and application features aspect, may be integrated with the data-modeling framework 110 in an overall system. The content management framework 112 provides the developer with tools to automatically generate SQL code to access data from the physical database or to update data in the physical database. The developer is presented with a series of efficient GUIs, which are used to create highly complex query statements. The resulting SQL code is dynamically generated based on the configuration and cached in the database.

As these queries are modified, the system automatically adjusts that code stored in the physical database, saving time and reducing the chance of error. This feature allows the developer to quickly implement enhancements to the application and reduce the time required for application testing. In addition, the system provides the developer the ability to write custom SQL statements and have them stored in the system as output queries.

The data manipulation layer 805 is used to process update queries, and the data access layer 810 is used to process output queries. A query is a logical representation of SQL code that allows information to be entered into and retrieved from the system. Output queries are used to retrieve information stored in the system. This information is returned in a data shape (record sets inside of record sets). Update queries are used to create an interface for entering information into the system. The data access layer 810 allows the user to form output queries using conditions 815, attribute bundles 820 and order 825. The data manipulation layer 805 allows the user to form update queries using workflows 830, history 835, business rules 840, hidden fields 845, and required fields 850.

The presentation layer 865 of the integrated content management 112 includes content tools 855 and navigation 860. As will be discussed in greater detail below, the content tools 855 provides content screens or presentation templates that include all functionality required to display a summary list of the records being managed, to add new, edit, delete, un-approve, reset, save, and approve records, and to display the detailed content edit/entry screen with edit history and workflow.

The navigation 860 includes an interface to allow the developer to build an entire navigation structure (e.g., parent-child relationships between navigation items) for an application without coding. Each navigation item is dynamically generated and can be linked to an update query, an output query, or a page. The system automatically generates the necessary code to manage and display the navigation structure. Navigation 860 will be described in greater detail below.

The objects generated using the components in the integrated content management 112 are available for the developer to access using the system API interfaces. For example, the developers can use the API interface to access the output queries, update queries, navigation structures, etc. for use in building applications. Although not described here, there may be other components in the integrated content management 112 and they may also be accessible through the system API interface.

VI. Navigation

Figure 3:
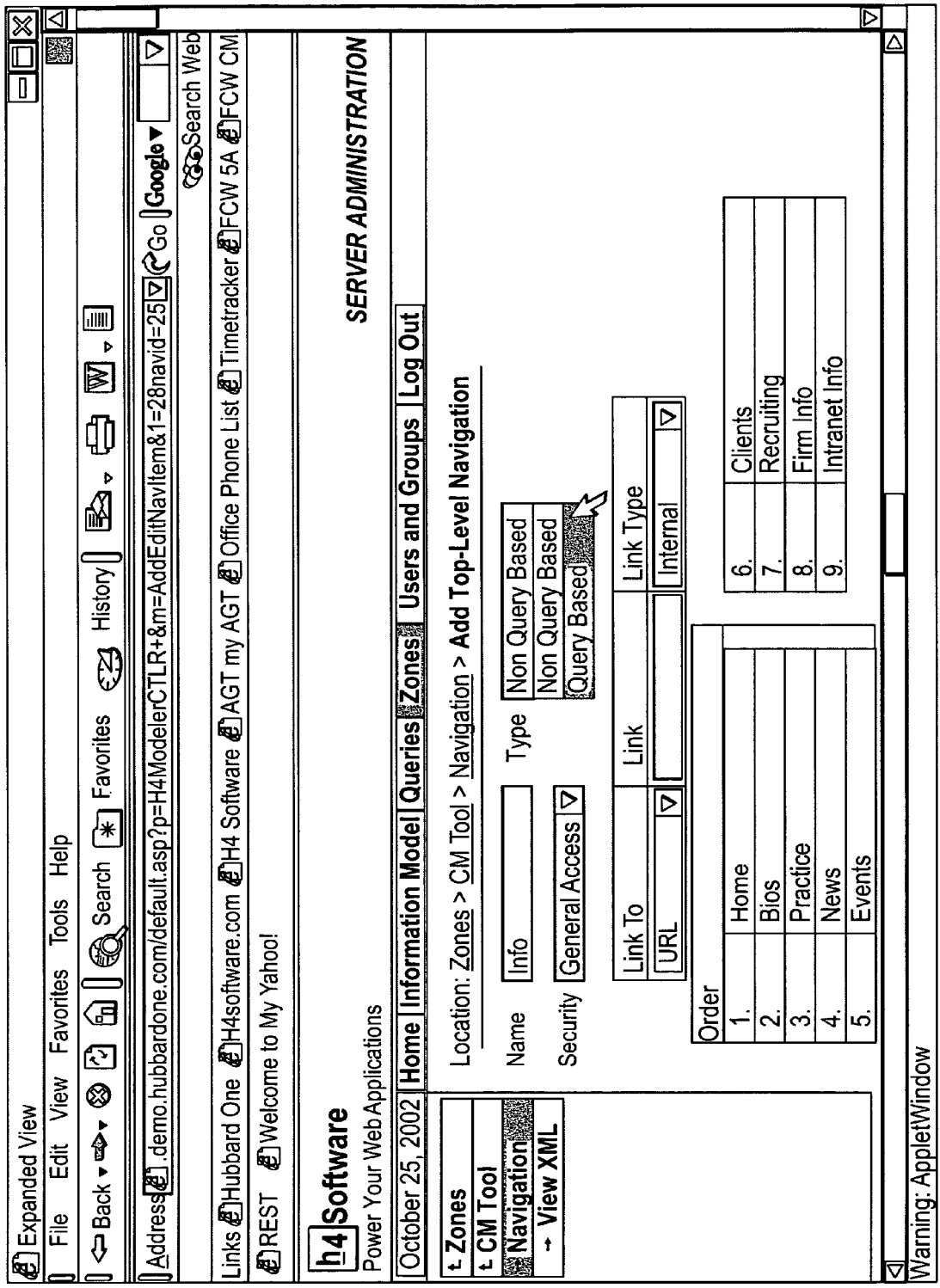
FIG. 3 illustrates an example of a graphical interface used by the user to develop navigation items.

FIG. 3 illustrates an example of a graphical interface 300 used by the user to develop navigation items. A top-level navigation item can be set-up by the user via interface 300. The developers can create a hierarchical system of navigation structures to include navigation items which are dynamically generated by the system and can be linked to an update query, an output query, or a page (e.g., ASP page, URL, etc.), as described with integrated content management 112. When adding a navigation item, a number of characteristics need to be identified, including name of the navigation item, query vs. non-query based, security restrictions, link and child navigation, etc.

Each navigation item is allowed to have zero or one parent. When a navigation item is not associated to a parent, it is considered to be top-level navigation. Similarly, each navigation item may have zero to many children navigation items. Each navigation item can be associated with a zone that refers to an instance of an application is a physical environment or location. For example, zones include, but are not limited to websites, intranet applications, extranets, content management applications, and wireless applications.

The system allows the developer to create navigation items that are dynamically populated by records stored in the database. The developer defines the navigation query (e.g., attribute bundle, sort order and attributes to be displayed, etc.) and the system automatically generates the SQL code to query the database and create the navigation items. The system allows query-based navigation items to pass parameters into the query or page it is linked with. The system allows the developer to generate and store the XML code to represent the navigation structure defined in the system. The system automatically generates the necessary code to manage and display the navigation structure. The system allows the developers to restrict access to individual navigation items by user groups, so that only users that are members of the allowed groups can have accesses to the navigation items.

Figure 4:
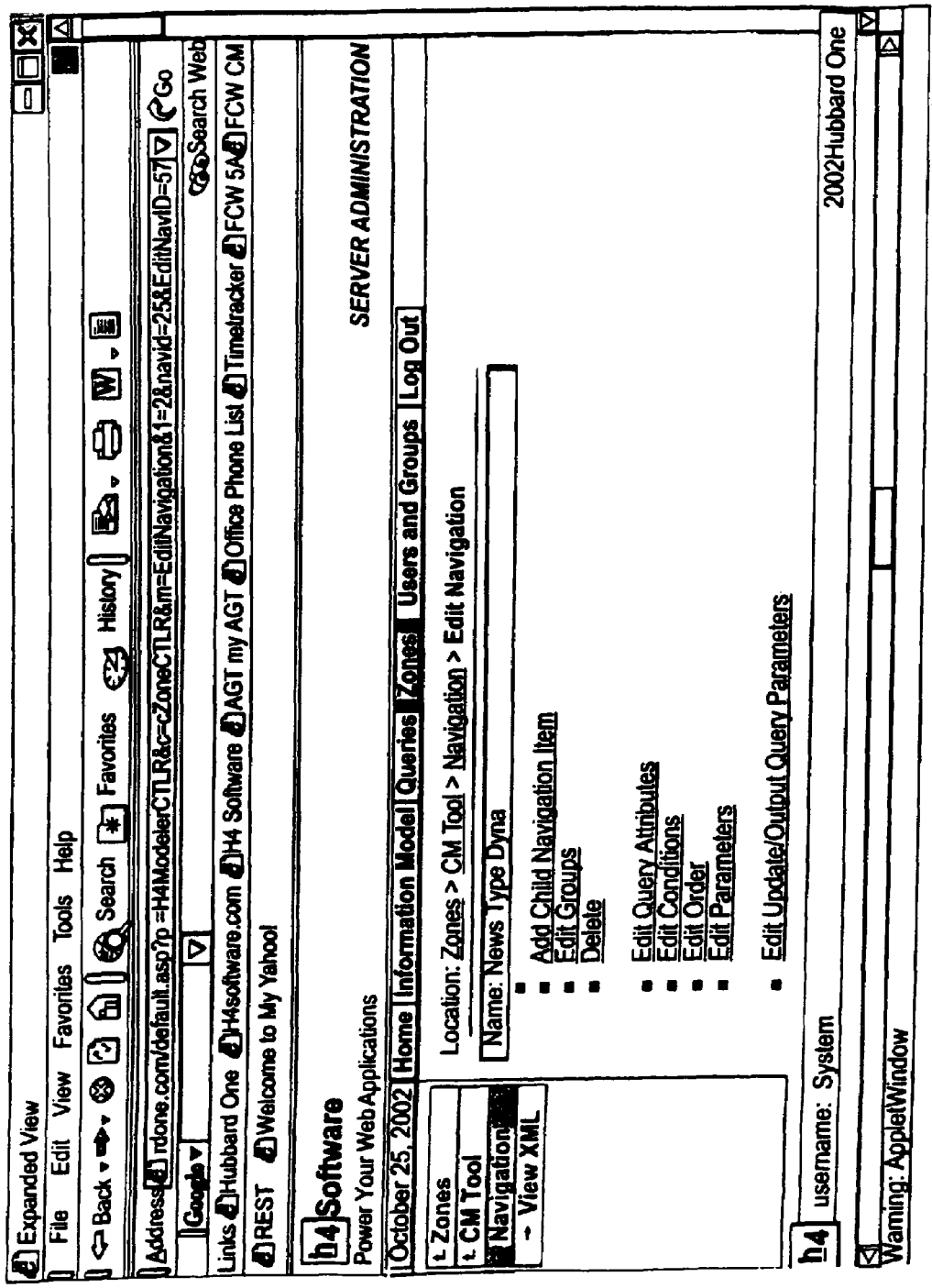
FIG. 4 illustrates an example of a graphical interface used by a user to edit navigation items.
Figure 5:
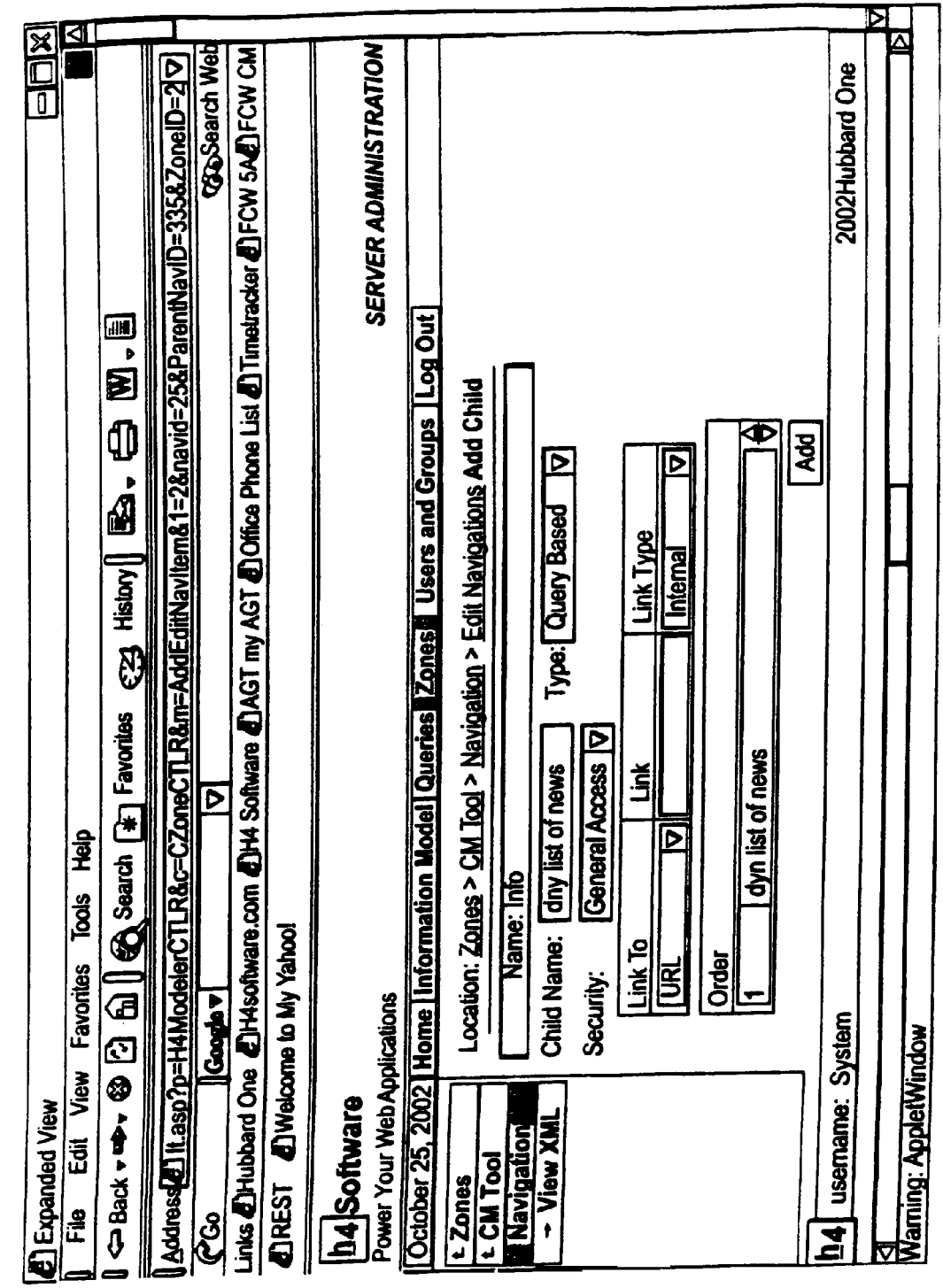
FIG. 5 illustrates an example of a graphical interface used by a user to add a child navigation item.

FIG. 4 illustrates an example of a graphical interface 400 used by a user to edit navigation items. After a navigation item has been added via the graphical interface 300, the user can edit the navigation item. Examples of attributes that the user can edit include the navigation item's name, links, order and security settings. The user can add a child navigation item. If this option is selected a graphical interface 500 is provided to add a child navigation item as illustrated in FIG. 5. Graphical Interface 500 requires that when adding a child navigation item, a number of characteristics need to be identified, including child name, query vs. non-query based, security restrictions, link and order characteristics.

Returning to FIG. 4, via graphical interface 400 the user can edit groups of related information associated with the navigation item and, a navigation item can be deleted. Also through this graphical interface 400, query attributes, conditions, order, parameters and update/output query parameters can be edited.

VII. Content Tools

Figure 6:
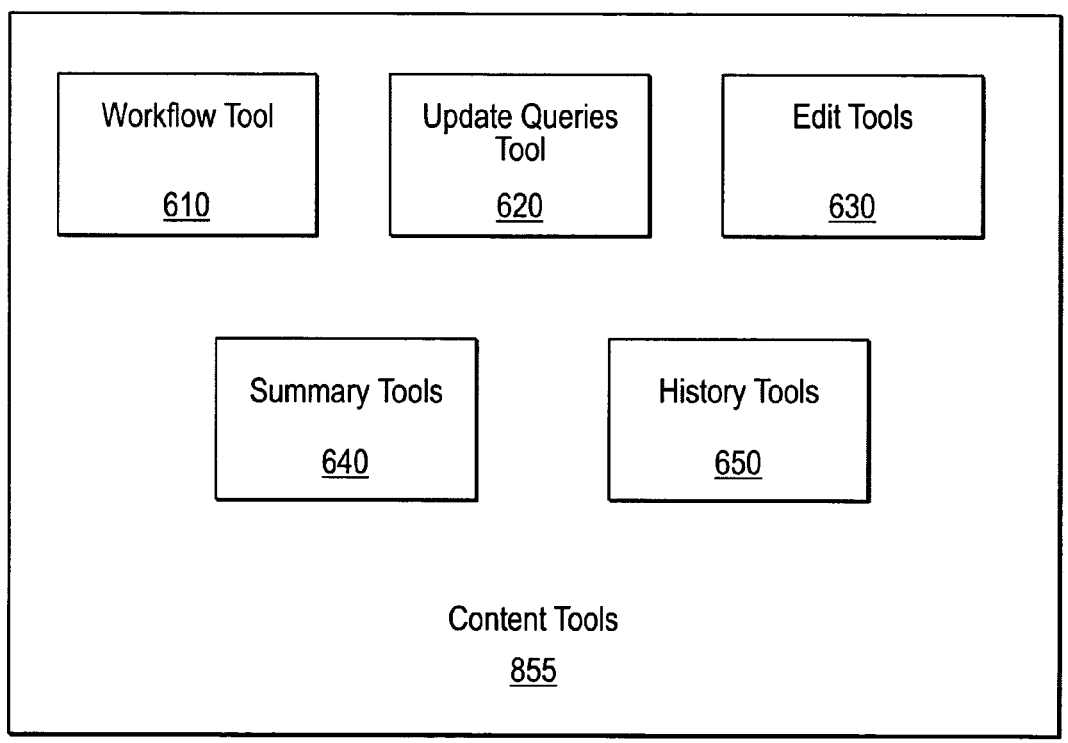
FIG. 6 illustrates a functional block diagram of content management.

Content tools 855 is another application feature of the integrated content management 112. FIG. 6 illustrates a functional block diagram of content tools 855. As will be discussed immediately below. Content management includes five tools in one embodiment of the present invention. These tools are workflow tool 610, update queries tool 620, edit tools 630, summary tools 640, and history tools 650.

A. Workflow Tool 610

The system allows the user to define custom workflow stages that are dynamically generated from the database. There is no limit to the number of workflow stages that can be created. In addition, the user is able to create a custom label for the workflow stages. Workflow Stages allow users to define one or more operations involved in manipulating an asset. Each operation includes an association to one or more groups of users who have access to an asset in that workflow stage. Workflow stages may also be associated with business rules, required fields, and hidden fields (each described further below).

Figure 7:
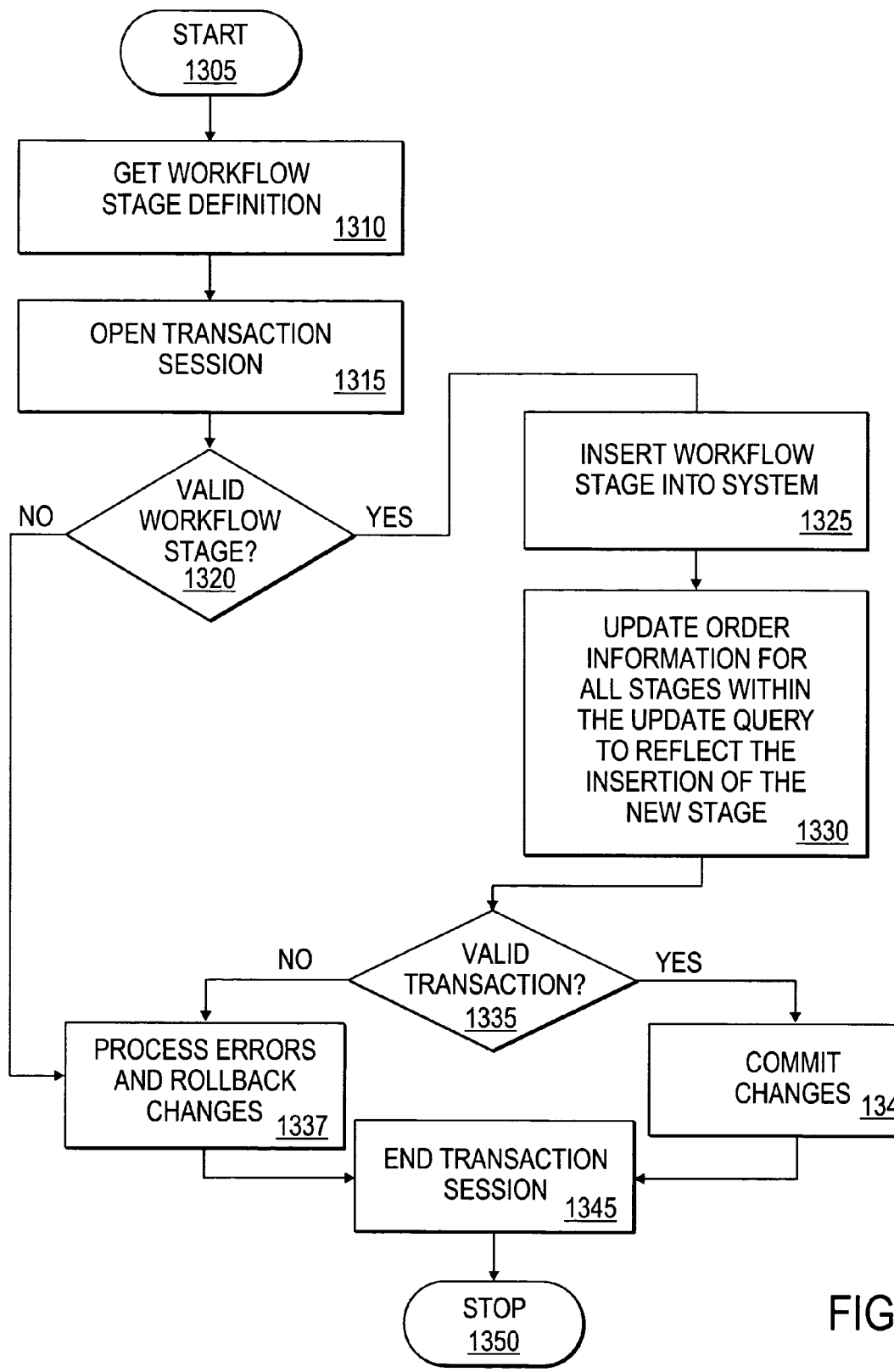
FIG. 7 is a flow diagram illustrating one example of an add workflow stage process.

FIG. 7 is a flow diagram illustrating one example of an add workflow stage process. The process starts at block 1305. At block 1310, the system receives a workflow stage definition, which includes the stage name, the update query to which it belongs, and its order relative to the other workflow stages associated with the update query.

At block 1315, a transaction session is opened. The transaction session is used to manage errors and to batch changes to the physical database resulting from execution of various tasks in the process. This provides the ability to automatically rollback changes to the database. For example, when an error occurs during the add workflow stage process, tasks already completed can be reversed or roll backed to a state before any data-manipulation commands were executed.

At block 1320, checking is performed to ensure that the workflow stage is valid. If the workflow stage is not valid, the process flows to block 1337. Otherwise, at block 1325, the workflow stage definition is inserted into the system.

At block 1330, other workflow stages belonging to the same update query are updated in the system to reflect their order relative to the newly added workflow stage. At block 1335, the system tests for any errors that may have occurred during the process. If errors are detected, flow proceeds to block 1337, where all changes performed during the add workflow stage process are roll backed, or reversed, and errors and warnings are processed, which may include reporting them to the requesting process or user. If no errors occurred, the flow continues at block 1340, where the changes are committed, or finalized. At block 1345, the transaction session is closed. The process stops at block 1350.

Figure 8:
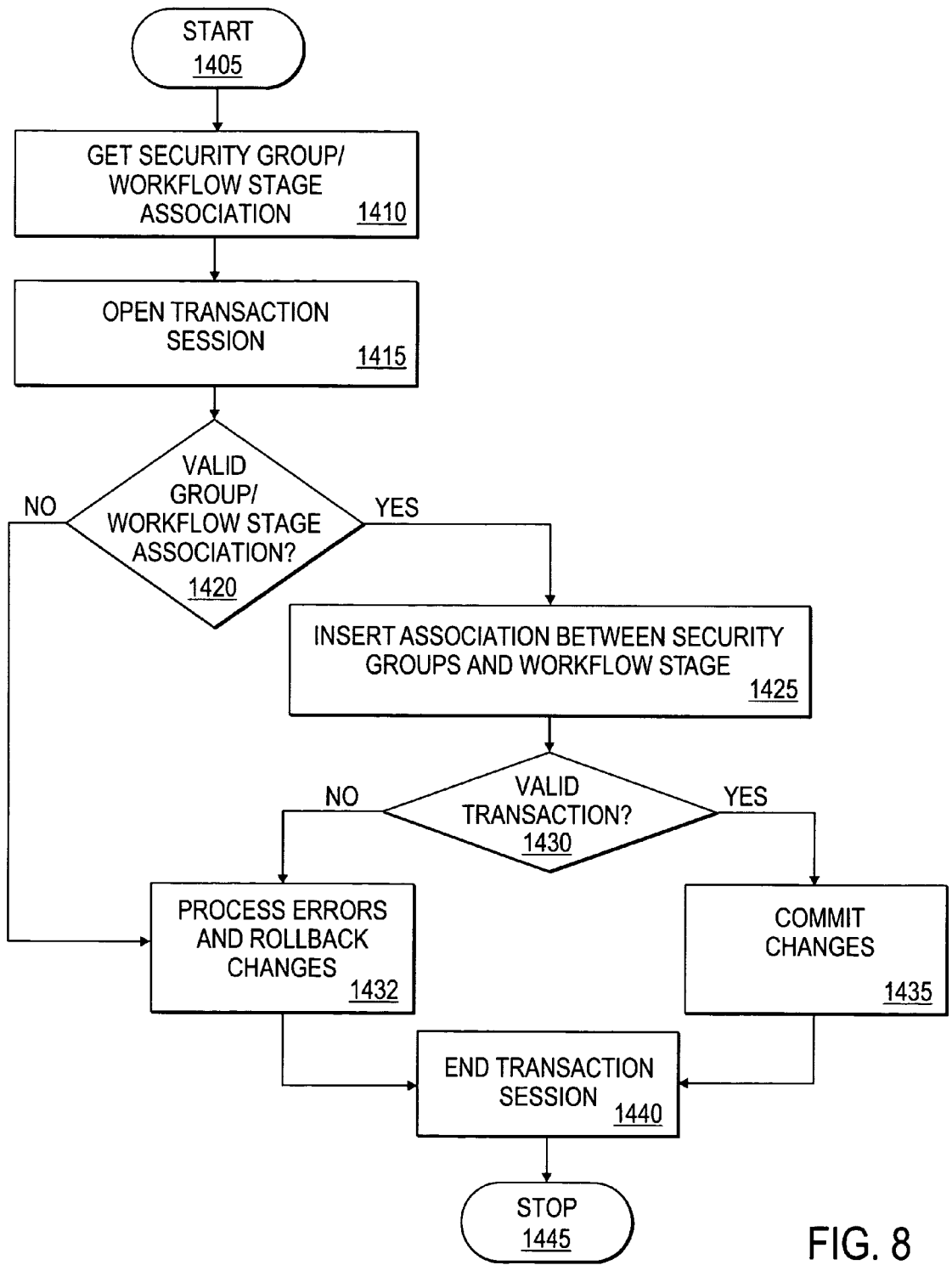
FIG. 8 is a flow diagram illustrating one example of a process used to add a security group to a workflow stage.

FIG. 8 is a flow diagram illustrating one example of a process used to add a security group to a workflow stage. The process starts at block 1405. At block 1410, the system receives a security group/workflow stage association, which includes the workflow stage and one or more security groups to be associated with it.

At block 1415, a transaction session is opened. The transaction session is used to manage errors and to batch changes to the physical database resulting from execution of various tasks in the process. This provides the ability to automatically rollback changes to the database. For example, when an error occurs during the add security group to workflow stage process, tasks already completed can be reversed or roll backed to a state before any data-manipulation commands were executed.

At block 1420, checking is performed to ensure that the association is valid. If it is invalid, the process flows to block 1432 to process error. If it is valid, the process flows to block 1425, where the association is inserted into the system.

At block 1430, the system tests for any errors that may have occurred during the process. If errors are detected, flow proceeds to block 1432, where all changes performed during the add security group to workflow stage process are roll backed, or reversed, and errors and warnings are processed, which may include reporting them to the requesting process or user. If no errors occurred, the flow continues at block 1435, where the changes are committed, or finalized. At block 1440, the transaction session is closed. The process stops at block 1445.

B. Update Queries Tool 620

An update query allows the user to both access and manipulate data. It includes all elements of an output query for accessing data—attribute bundles, conditions, and order—as well as elements useful for manipulating data, including workflows, business rules, required fields, and hidden fields. When manipulating data with an update query, the following features are automatically applied (other data-management issues may also be automatically handled by the system):

- Multiple versions of a record can be managed as a single asset-that is, they possess identical Asset IDs.
- Simultaneous edits to a single asset by multiple users, or collisions, may be handled.
- Edited fields are automatically checked to make sure the data types are valid for the attributes to which they belong.
- The "one" end of a one-to-one or one-to-many relationship is enforced, ensuring relational data integrity.
- Inheritance is automatically managed, allowing simultaneous, transparent manipulation of several data tables in a single operation.

Each asset manipulation has a corresponding history record, which includes information about which user performed the manipulation, at what date/time it was performed, which workflow stage the asset was associated with as the end result of the manipulation, and which versions of the asset were manipulated.

Figure 9:
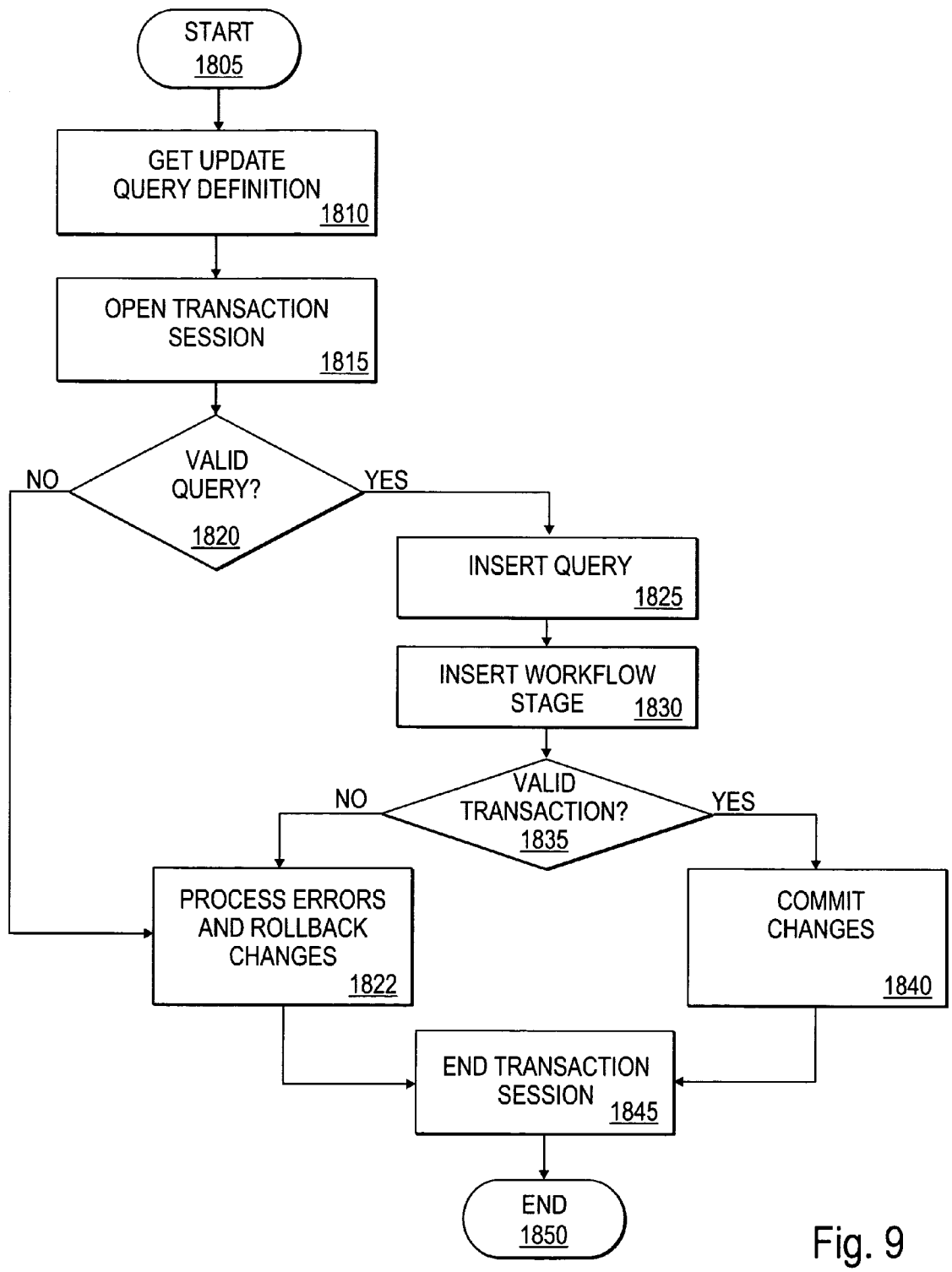
FIG. 9 is a flow diagram illustrating an example of adding update queries.

FIG. 9 is a flow diagram illustrating an example of a process for adding update queries. The process starts at block 1805. At block 1810, the system receives an update query definition, which includes a name for the update query and attribute bundle.

At block 1815, a transaction session is opened. The transaction session is used to manage errors and to batch changes to the physical database resulting from execution of various tasks in the process. This provides the ability to automatically rollback changes to the database. For example, when an error occurs during the add update query process, tasks already completed can be reversed or roll backed to a state before any data-manipulation commands were executed.

At block 1820, checking is performed to ensure that the query is valid. This checking may include, but is not limited to, testing the uniqueness of the query name. If the query is invalid, the process flows to block 1822. If the query is valid, the process flow to block 1825.

At block 1825, the update query definition is inserted into the system. At block 1830, a default workflow stage is inserted into the system. At block 1835, the system tests for any errors that may have occurred during the process. If errors are detected, flow proceeds to block 1822, where all changes performed during the add update query process are roll backed, or reversed, and errors and warnings are processed, which may include reporting them to the requesting process or user. If no errors occurred, the flow continues at block 1840, where the changes are committed, or finalized. At block 1845, the transaction session is closed. The process stops at block 1850.

When manipulating data with an update query several data-management issues are also automatically handled by the system. These include:
  Data requested for editing is returned to the user or requesting process in a representation consistent with the workflow stage in which it currently resides, including hiding any associated hidden fields from the requester.
  Multiple versions of a record can be managed as a single asset—that is they possess identical AssetIDs.
  Data requested for editing may be returned with a "check-out" date/time, allowing simultaneous edits to a single asset by multiple users, or collisions, to be handled.
  Edited fields are automatically checked to make sure their data type is valid for the attributes to which they belong.
  Each edit to an asset can test if required fields contain necessary data and an error may be returned to the user or requesting process if required fields are violated.
  The "one" end of a one-to-one or one-to-many relationship is enforced, ensuring relational data integrity.
  Relationships of types "inherits" and "inherits multiple" are automatically managed, allowing simultaneous, transparent manipulation of several data tables in a single operation.

The content tools 855 provides dynamic content management created by linking navigation items to an update query. The content tools 855 will automatically apply the presentation templates and the application is dynamically generated from the database and managed by the system. User controls on content entry screen are dynamically generated based on data type. Each attribute in the update query that is selected to be displayed renders dynamically from the database and the appropriate user control is presented based on the data type of the attribute. When the user submits the page, the information that the user entered into the fields is validated for the appropriate characters, number of characters, and/or hidden HTML tags.

C. Edit Tool 630

Figure 10:
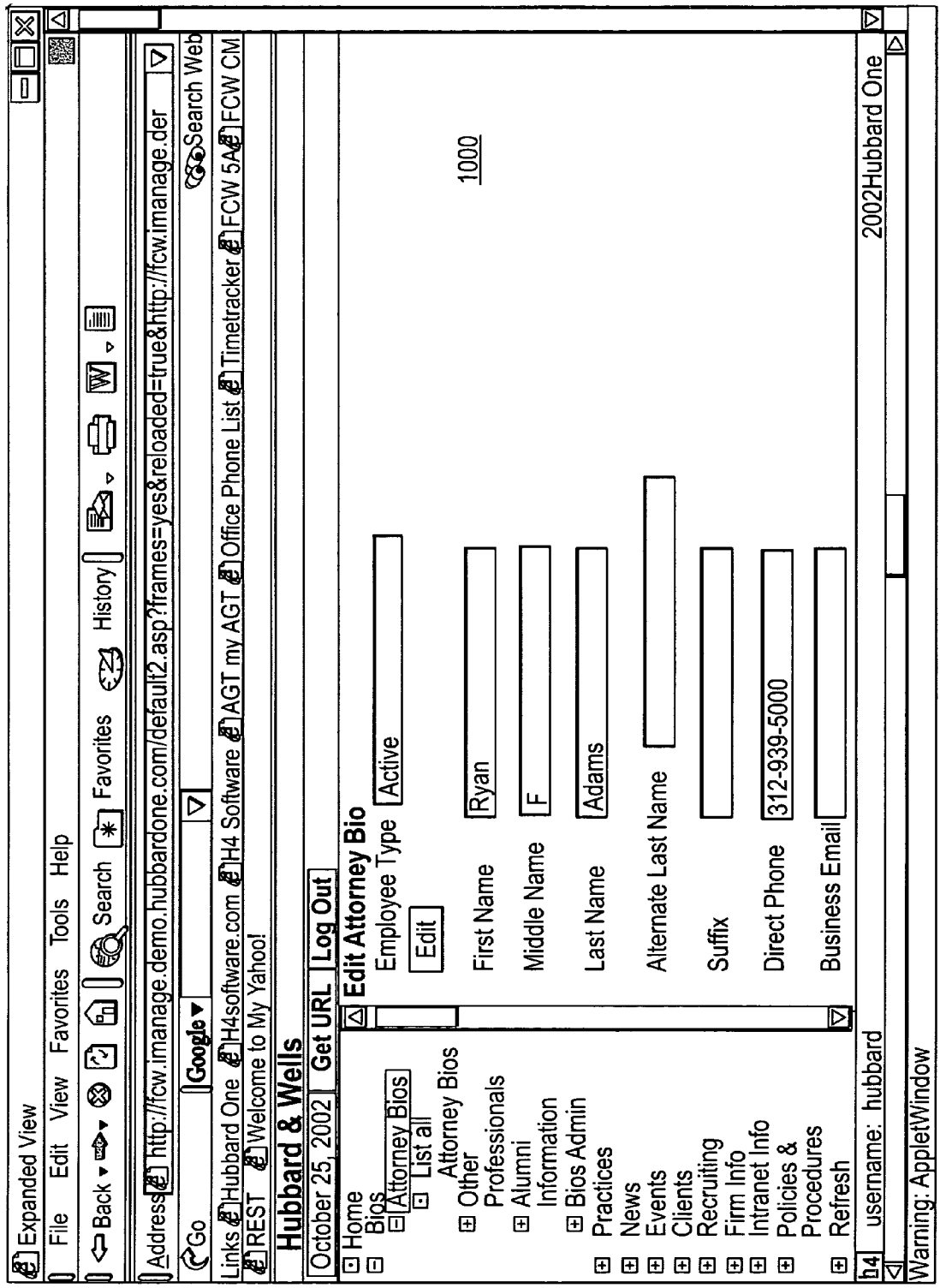
FIG. 10 illustrates an example of a graphical interface presented to the user, through which content can be edited.

The system allows the user to add and edit content stored in the database. Edit tool 630 generates a graphical interface through which edits are made. FIG. 10 illustrates an example of a graphical interface 1000 presented to the user, through which content can be edited. Edit interface 1000 includes multiple field in which content can be added or edited. In one embodiment, as shown in FIG. 10, an Attorney's Biographical information can be edited, including his employee type, name, phone number and e-mail address. Each field includes a label, and each label is customizable directly from and directly to the data model.

Figure 11:
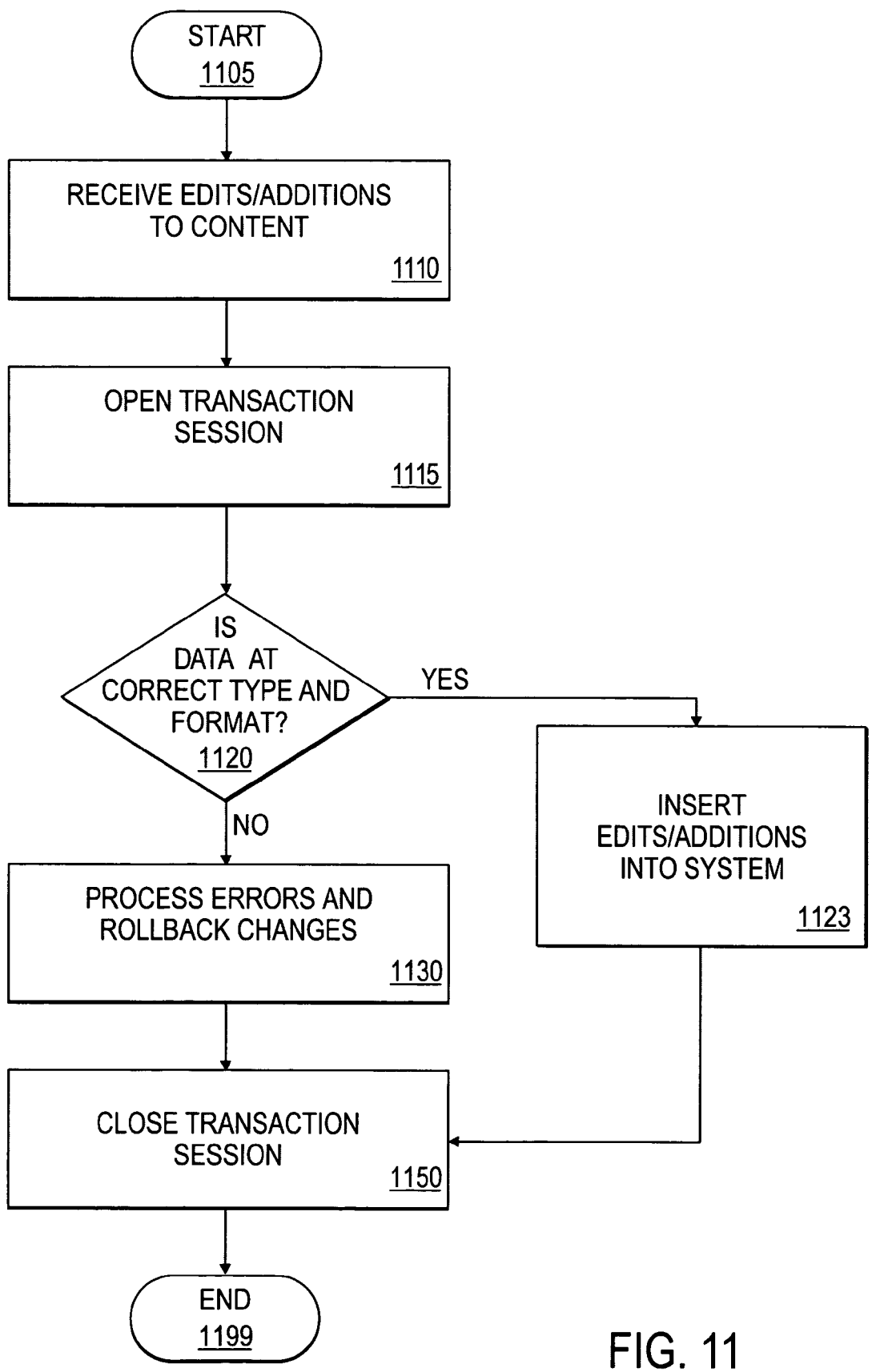
FIG. 11 is a flow diagram illustrating one example of a process performed by an edit tool.

FIG. 11 is a flow diagram illustrating one example of the process performed by edit tool 630. The process starts at block 1105. At block 1110, the system receives additions and edits to the data, such as the biographical information described above.

At block 1115, a transaction session is opened. The transaction session is used to manage errors and to batch changes to the physical database resulting from the execution of various tasks in the process. This provides the ability to automatically rollback changes to the database. For example, when an error occurs during the edit content process, tasks already completed can be reversed or roll-backed to a state before any data-manipulation commands were executed.

A block 1120, the system checks to ensure that the added and edited data is of the correct type and format. If it is correct, the process flows to block 1123, where the additions and edits are inserted into the system.

If the data is not of the correct type and format, flow proceeds to block 1130 where all changes performed during the edit/add content process are rollbacked, or reversed, and errors and warnings are processed, which can include reporting them to the requesting user.

After either rolling back the edits in block 1130 or after inserting the changes in block 1123, flow continues to block 1150, where the transaction session is closed. The process stops at block 1199.

D. Summary Tool 640

Figure 12:
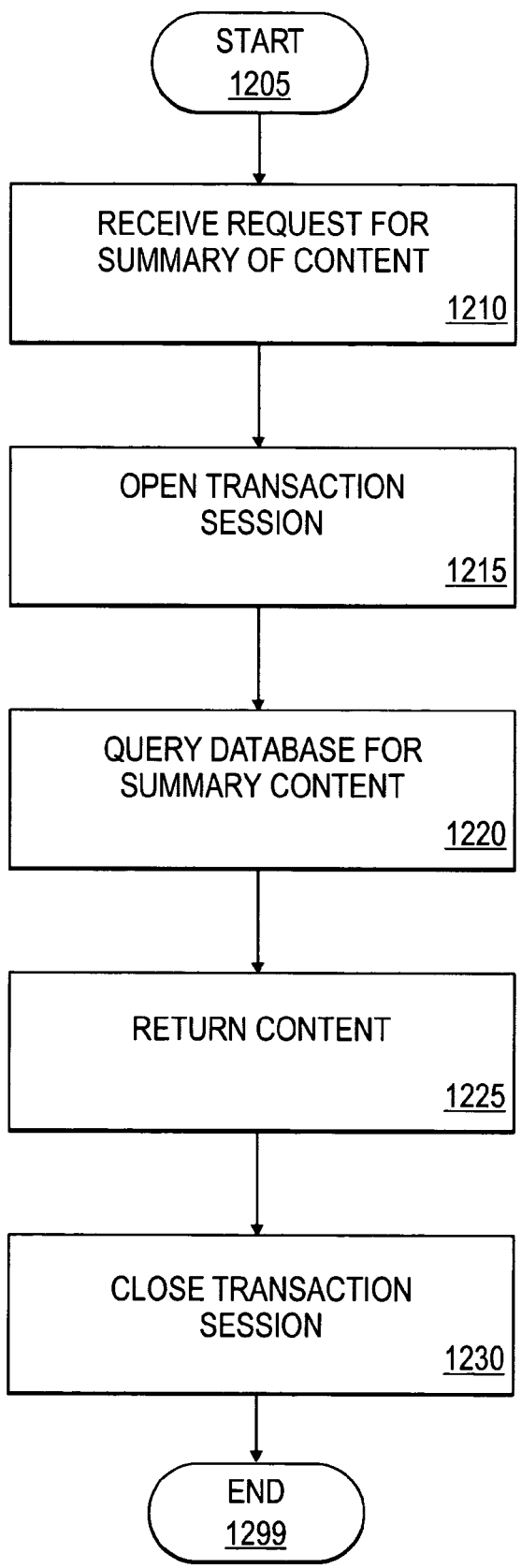
FIG. 12 is a flow diagram illustrating one example of a process performed by a summary tool.

FIG. 12 is a flow diagram illustrating one example of the process performed by summary tool 640. The process starts at block 1205. At block 1210, the system receives a user request for a summary. A summary request may request a concise listing of security attacks, a listing of events occurring at a particular security device, a summary of queries made in the last hour, or similar summarization of content.

At block 1215, a transaction session is opened. The transaction session is used to manage errors and to batch changes to the physical database resulting from the execution of various tasks in the process. This provides the ability to automatically rollback changes to the database. For example, when an error occurs during the summarization of content process, tasks already completed can be reversed or rollbacked to a state before any data-manipulation commands were executed.

At block 1220, the system automatically generates a query to the database that will retrieve all the content needed to generate the requested summary. The content is returned to the user at block 1225 via an automatically generated summary screen, that is created from a summary template in which the requested content is placed. Flow continues to block 1250, where the transaction session is closed. The process stops at block 1299.

E. History Tool 650

Figure 13:
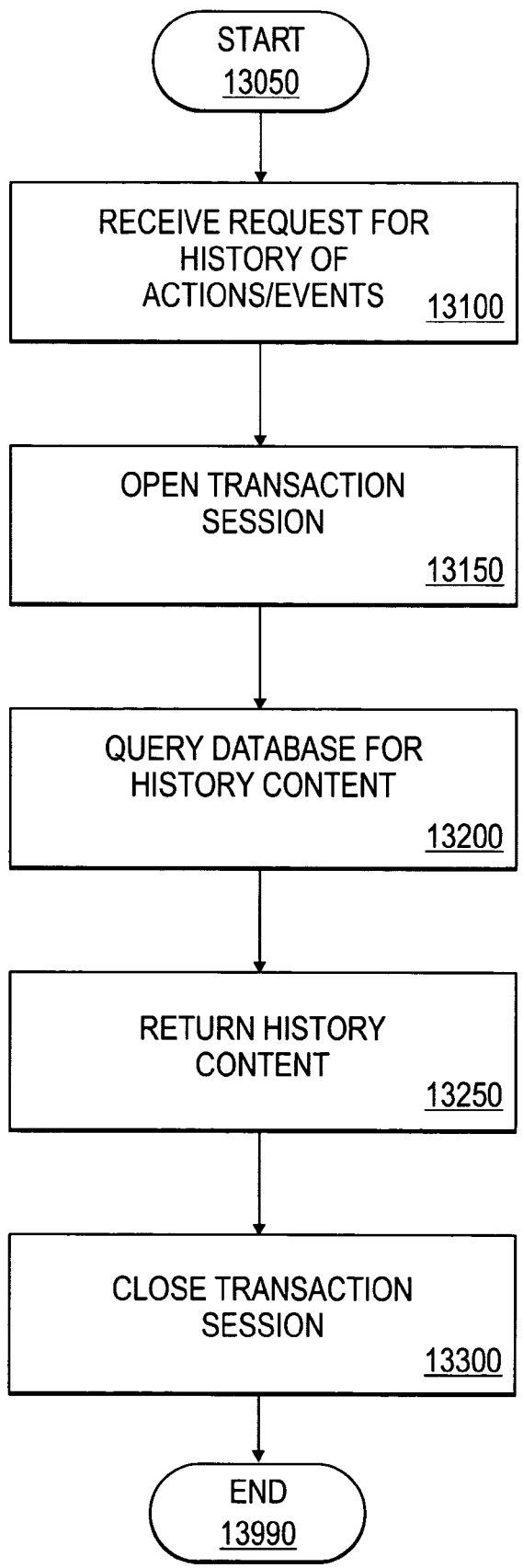
FIG. 13 is a flow diagram illustrating one example of a process performed by a history tool.

FIG. 13 is a flow diagram illustrating one example of the process performed by history tool 640. The process starts at block 13050. At block 13100, the system receives a user request for a history. A history may request a listing of security attacks over a certain time period, a listing of events occurring at a particular security device over a certain time period, a summary of queries made in the last hour, or similar history of content and events.

At block 13150, a transaction session is opened. The transaction session is used to manage errors and to batch changes to the physical database resulting from the execution of various tasks in the process. This provides the ability to automatically rollback changes to the database. For example, when an error occurs during the summarization of content process, tasks already completed can be reversed or rollbacked to a state before any data-manipulation commands were executed.

At block 13200, the system automatically generates a query to the database that will retrieve all the content needed to generate the requested history. The content is returned to the user at block 13250 via an automatically generated summary screen, that is created from a summary template in which the requested content is placed. Flow continues to block 13300, where the transaction session is closed. The process stops at block 13990.

A content management framework for use with a system for application development has been described. The system includes various methods used to define the information model to translate the information model into the physical database and to manage data in the physical database. The operations of these various methods may be implemented by a processing unit in a digital processing system, which executes sequences of computer program instructions which are stored in a memory which may be considered to be a machine-readable storage media. The memory may be random access memory, read only memory, a persistent storage memory, such as mass storage device or any combination of these devices. Execution of the sequences of instructions causes the processing unit to perform operations according to the present invention. The instructions may be loaded into memory of the computer from a storage device or from one or more other digital processing systems (e.g., a server computer system) over a network connection. The instructions may be stored concurrently in several storage devices (e.g., DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

Although the present invention has been described with reference to specific exemplary embodiments, it will be evident that various modifications and changes may be made to these embodiments without departing from the broader spirit and scope of the invention as set forth in the claims. For example, an information model that does not integrate data from external sources may not require definition of external data sets. Also, for example, this embodiment describes an implementation using a relational database (e.g., SQL Server 2000) as the physical data store, although the system is not limited to relational data stores. Accordingly, the specification and drawings are to be regarded in an illustrative rather than a restrictive sense.

What is claimed is:

1. A system for application development, comprising a processing unit which executes sequences of computer program instructions which are stored in a machine-readable storage memory, the instructions comprising:

a data-modeling framework configured to enable a user to define a logical data model, the data-modeling framework dynamically translating the logical data model into a corresponding physical data model, and to dynamically optimize the corresponding physical data model based on the defined logical data model, wherein changes to the logical data model are automatically adjusted in the physical data model accordingly in response to a command received from the user via the data modeling framework without having to invoke another database development framework external to the data modeling framework, such that the physical data model is automatically updated in response to the defined logical data model;

application framework integrated with the data modeling framework to enable the user to develop an enterprise application to access one or more databases represented by the physical data model, wherein the application framework is able to access the physical data model while the data modeling framework is able to substantially concurrently access the physical data model through the logical data model; and a content management framework integrated with the data-modeling framework and the application framework, the content management framework configured to provide tools to enable the user to manage content developed via the application framework and associated with the physical data model based on the logical data model, wherein the content management framework includes a data access layer to allow a user to generate an output query using one or more conditions, attribute bundles, and order information, wherein the output query is used to retrieve information stored in the system and information is returned in a data shape including a record set within another record set, a data manipulation layer to allow the user to generate an update query using workflow information, history information, and one or more business rules, wherein the update query is used to create an interface for entering information into the system, and a presentation layer having a content tool and a navigation unit, wherein the content tool is configured to provide content screens or presentation templates that include functionalities required to display a summary list of records being managed, wherein the navigation unit includes an interface to allow the user to build a navigation structure for the enterprise application without coding, wherein each navigation item is dynamically generated and linked to the update query, the output query, or a page, wherein the system automatically generates necessary code to manage and display the navigation structure, and wherein updated features represented by the updated physical data model are automatically available to the user via the application framework or the content management framework, and wherein the enterprise application being developed using the application framework automatically reflects the updated features which can be manipulated via the content management framework.

2. The system of claim 1, wherein the enterprise application is a Web page used by a law firm, wherein the Web application comprises a first field for displaying information regarding one or more attorneys of the law firm, and a second field for displaying information regarding the law firm in general, wherein the information associated with the one or more attorneys and the law firm is stored in the one or more databases represented by the physical data model which is defined and manipulated via the logical data model using the data modeling framework, and wherein content of the Web page can be manipulated via the content management framework.

3. The system of claim 1, further comprising a security modeling framework that integrates workflow and navigation with access to the content being managed.

4. The system of claim 1, wherein the content management framework automatically generates code for displaying histories, summaries, edit screens, navigation, and workflow.

5. The system of claim 1, further comprising metadata that defines relationships between the logical data model and the physical data model.

6. The system of claim 5, wherein one or more text boxes, buttons, and drop-down lists on a GUI (graphical user interface) are dynamically generated based on a data type defined in the logical data model.

7. A method for use with an application development system, comprising:
providing a data-modeling framework configured to enable a user to define a logical data model, the data-modeling framework dynamically translating the logical data model into a corresponding physical data model, and to dynamically optimize the corresponding physical data model based on the defined logical data model, wherein changes to the logical data model are automatically adjusted in the physical data model accordingly in response to a command received from the user via the data modeling framework without having to invoke another database development framework external to the data modeling framework, such that the physical data model is automatically updated in response to the defined logical data model;
providing application framework integrated with the data modeling framework to enable the user to develop an enterprise application to access one or more databases represented by the physical data model, wherein the application framework is able to access the physical data model while the data modeling framework is able to substantially concurrently access the physical data model through the logical data model; and
providing a content management framework integrated with the data-modeling framework and the application framework, the content management framework configured to provide tools to enable the user to manage content developed via the application framework and associated with the physical data model based on the logical data model, wherein the content management framework includes
a data access layer to allow a user to generate an output query using one or more conditions, attribute bundles, and order information, wherein the output query is used to retrieve information stored in the system and information is returned in a data shape including a record set within another record set,
a data manipulation layer to allow the user to generate an update query using workflow information, history information, and one or more business rules, wherein the update query is used to create an interface for entering information into the system, and
a presentation layer having a content tool and a navigation unit, wherein the content tool is configured to provide content screens or presentation templates that include functionalities required to display a summary list of records being managed, wherein the navigation unit includes an interface to allow the user to build a navigation structure for the enterprise application without coding, wherein each navigation item is dynamically generated and linked to the update query, the output query, or a page, wherein the system automatically generates necessary code to manage and display the navigation structure, and
wherein updated features represented by the updated physical data model are automatically available to the user via the application framework or the content management framework, and wherein the enterprise application being developed using the application framework automatically reflects the updated features which can be manipulated via the content management framework.

8. The method of claim 7, wherein providing a content management framework comprises:
defining sets with one or more associated attributes;
defining relationships between the sets;
creating queries by selecting fields in a query display;
defining workflow stages associated with the queries; and
assigning one or more navigation items to the queries.

9. The method of claim 8, further comprising:
providing an editing/entry template that automatically generates an edit/entry screen for adding, editing, deleting, approving, resetting and saving content;
displaying an editing/entry screen; providing a summary template that automatically generates a summary list containing content managed by the system;
displaying the summary list; providing an edit-history template that automatically generates an edit-history screen; and
displaying the edit-history screen;
providing a workflow template that automatically generates a workflow screen;
displaying the workflow screen; and
updating the physical data model automatically.

10. The method of claim 9, further comprising providing a security modeling framework that integrates workflow and navigation with access to the content being managed.

11. The method of claim 10, wherein the content management framework automatically generates code for displaying the edit-history screen, the summary list, the editing/entry screen, and the workflow screen.

12. The method of claim 11, further comprising providing metadata that defines relationships between the logical data model and the physical data model.

13. The method of claim 12, wherein one or more text boxes, buttons, and drop-down lists on the edit-history screen, the summary list, the editing/entry screen, and the workflow screen are dynamically generated based on a data type defined in the logical data model.

14. A system for application development, comprising a processing unit which executes sequences of computer program instructions which are stored in a machine-readable storage memory, the instructions comprising: means for data-modeling by enabling a user to define a logical data model, the data-modeling framework dynamically translating the logical data model into a corresponding physical data model, and to dynamically optimize the corresponding physical data model based on the defined logical data model, wherein changes to the logical data model are automatically adjusted in the physical data model accordingly in response to a command received from the user via the data modeling framework without having to invoke another database development framework external to the data modeling framework, such that the physical data model is automatically updated in response to the defined logical data model;

means for application development by integrating an application framework with the data modeling framework to enable the user to develop an enterprise application to access one or more databases represented by the physical data model, wherein the application framework is able to access the physical data model while the data modeling framework is able to substantially concurrently access the physical data model through the logical data model; and means for content managing by providing tools to enable the user to manage content associated with the physical data model based on the logical data model, wherein the content managing means is coupled to the data-modeling means, wherein means for content managing includes a data access layer to allow a user to generate an output query using one or more conditions, attribute bundles, and order information, wherein the output query is used to retrieve information stored in the system and information is returned in a data shape including a record set within another record set, a data manipulation layer to allow the user to generate an update query using workflow information, history information, and one or more business rules, wherein the update query is used to create an interface for entering information into the system, and a presentation layer having a content tool and a navigation unit, wherein the content tool is configured to provide content screens or presentation templates that include functionalities reciuired to display a summary list of records being managed, wherein the navigation unit includes an interface to allow the user to build a navigation structure for the enterprise application without coding. wherein each navigation item is dynamically generated and linked to the update query, the output query, or a page, wherein the system automatically generates necessary code to manage and display the navigation structure, and wherein updated features represented by the updated physical data model are automatically available to the user via the means for application development or the means for content managing, and wherein the enterprise application being developed using the means for application development automatically reflects the updated features which can be manipulated via the means for content managing.

15. The system of claim 14, wherein the content management means:

means for defining sets with one or more associated attributes; means for defining relationships between the sets;

means for creating queries by selecting fields in a query display;

means for defining workflow stages associated with the queries; and means for assigning one or more navigation items to the queries.

16. The system of claim 15, further comprising:

means for providing an editing/entry template that automatically generates an edit/entry screen for adding, editing, deleting, approving, resetting and saving content; means for displaying an editing/entry screen;

means for providing a summary template that automatically generates a summary list containing content managed by the system;

means for displaying the summary list;

means for providing an edit-history template that automatically generates an edit-history screen; and means for displaying the edit-history screen; means for providing a workflow template that automatically generates a workflow screen; means for displaying the workflow screen; and means for updating the physical data model automatically.

17. The system of claim 16, further comprising means for providing a security model that integrates workflow and navigation with access to the content being managed.

18. The system of claim 17, wherein the content management means automatically generates code for displaying the edit-history screen, the summary list, the editing/entry screen, and the workflow screen.

19. The system of claim 18, further comprising providing metadata that defines relationships between the logical data model and the physical data model.

20. The system of claim 19, wherein one or more text boxes, buttons, and drop-down lists on the edit-history screen, the summary list, the editing/entry screen, and the workflow screen are dynamically generated based on a data type defined in the logical data model.

\* \* \* \* \*

UNITED STATES PATENT AND TRADEMARK OFFICE
CERTIFICATE OF CORRECTION

PATENT NO. : 7,305,656 B2  Page 1 of 1
APPLICATION NO. : 10/367261
DATED : December 4, 2007
INVENTOR(S) : Fish et al.

It is certified that error appears in the above-identified patent and that said Letters Patent is hereby corrected as shown below:

On the Title page, in field (73), in "Assignee", in column 1, line 1, after "Wells" delete "," and insert -- D/B/A Hubbardone, --, therefor.

In column 3, line 30, before "DESCRIPTION" insert -- BRIEF --.

In column 3, line 45, after "integrated" insert -- content --.

In column 8, line 64, delete "zip," and insert -- .zip, --, therefor.

In column 13, line 30, delete "requester." and insert -- requestor. --, therefor.

In column 19, line 38, in Claim 14, delete "reciuired" and insert -- required --, therefor.

In column 19, line 42, in Claim 14, after "coding" delete "." and insert -- , --, therefor.

Signed and Sealed this

Twenty-second Day of July, 2008

JON W. DUDAS
*Director of the United States Patent and Trademark Office*